United States Patent [19]

Drax et al.

[11] 3,816,650

[45] June 11, 1974

[54] SENSING MINOR BRIGHTNESS DIFFERENCES IN THE TELEVISION IMAGE IN A SYSTEM FOR ZONE-MELTING OF A SEMICONDUCTOR

[75] Inventors: Heinz Drax, Munich; Hans Stut, Groebenzell, both of Germany

[73] Assignee: Siemens Aktiengesellschaft, Berlin and Munich, Germany

[22] Filed: Mar. 9, 1973

[21] Appl. No.: 339,724

[30] Foreign Application Priority Data

Apr. 27, 1972 Germany ........................... 2220819

[52] U.S. Cl. ........................... 178/6.8, 178/DIG. 36

[51] Int. Cl. ........................................... H04n 7/18

[58] Field of Search ..... 178/6, 6.8, DIG. 1, DIG. 36

[56] References Cited

UNITED STATES PATENTS

| | | | |
|---|---|---|---|
| 3,218,389 | 11/1965 | Reed | 178/6 |
| 3,243,509 | 3/1966 | Stut | 178/6 |
| 3,818,757 | 2/1973 | Gulitz | 178/DIG. 36 |

*Primary Examiner*—Howard W. Britton

*Attorney, Agent, or Firm*—Hill, Gross, Simpson, Van Santen, Steadman, Chiara & Simpson

[57] ABSTRACT

This invention relates to a system for controlling the diameter of the semiconductor rod at the solidification front of the molten zone, and more particularly to such a system wherein the image of the molten zone is recorded by a television camera and is scanned line by line by an electron beam, and wherein a number of pulses is produced by a gating arrangement during the time at which the image of the semiconductor rod is scanned. The number of these pulses is proportional to the diameter of the semiconductor rod. Means is used which automaticly produces a triggering pulse due to the sudden change of the radiation intensity when the solidification front is traversed by the scanning beam. The first mentioned pulses are stored line by line and the time of the triggering pulse compared with a programmed desired value of the diameter of the semiconductor rod so that the resulting deviation controls a push-pull arrangement with respect to the programming of the diameter of the semiconductor rod.

5 Claims, 4 Drawing Figures

SENSING MINOR BRIGHTNESS DIFFERENCES IN THE TELEVISION IMAGE IN A SYSTEM FOR ZONE-MELTING OF A SEMICONDUCTOR

DESCRIPTION OF THE PRIOR ART

A system of the aforementioned type is described in U.S. Pat. No. 3,243,509. In such a system, the area of the molton zone in a semiconductor rod is recorded with a television camera comprising a multiple photo cell system known as a vidicon system. The image of the area of the molten zone is scanned line by line with an electron beam within the television tube and supplies pulses the amplitude of which is proportional to the brightness of the image. These pulses are fed to a peak value rectifier. The summed peak values are supplied to a triggering system. By way of differentiating, amplifying and an amplitude limiting a triggering pulse is produced. This triggering pulse releases pulses strech in a counter, which are proportional to the diameter of semiconductor rod at the solid-liquid interface for a desired predetermined value comparison and for control of the push-pull arrangement.

If during scanning line by line the solid-liquid interface is passed there is a drop in the peak value of the pulses due to a drop of radiation intensity. At this first line in the image of the molten zone no further pulse is produced. The absence of a further pulse is used for triggering in the aforementioned known system.

SUMMARY OF THE INVENTION

In order to improve the system, as it is described in the aforementioned Letters Patent, it is suggested by the present invention to compare the instantaneous values two respectively successive lines while forming the difference of the given instantaneous value and the value which was present one line earlier, that is this value is delayed for the scanning time of one line in order to find the that line in the image within a television tube which is the first line in the molten part of the semiconductor rod at the solidification front. The change in the difference of the compared signals is used for triggering the control mechanism when the solid liquid interface at the solidification front is passed.

According to the invention the aforementioned task is achieved in such a way that a signal comparing circuit is inserted into the control loop in order to determine the line of the television image which is the first line in the molten range in the image of the area of a molten zone, and the instantaneous value of the signal provided is compared with the instantaneous value of the signal supplied one line earlier by means of forming the difference of the two signals, and the change in the difference is used for triggering the control process.

Since this method is based on a difference formation, the essential advantage of this circuit resides in the fact that the absolute value of brightness signal is of no importance in the control process. This is particularly important with an ac-coupled image signal, since the average value of the dc-voltage fluctuates with the picture content. According to this invention, an ultrasonic delay line having a time delay of the duration of the scanning of one line ($\cong$ 64 $\mu$s "CCIR") is connected into the signal comparing circuit in order to delay the signal provided one line earlier, and the delayed signal is connected with the undelayed signal in a differential amplifier whose output is connected with the triggering system of the control loop. The triggering of process is effected by means of the directional change of the difference pulse when solid liquid interface is exceeded.

A further embodiment of the signal comparing circuit comprises two parallel RC circuits having equal charge time constants which are very short compared with the scanning duration of one line, and two different discharge time constants, whereby the time constant of one of the RC circuits corresponds to the order of magnitude of the scanning duration of one line (approximately 64 $\mu$s), while that of the second RC circuit is very large compared with the scanning duration of one line, so that the stored maximum image brightness signal remains constant over the entire scanning cycle of the television image of the molten zone. The voltages at the two RC circuits are compared in a differential amplifier whose output is connected with the triggering system of the control loop.

The two RC circuits are charged to the same maximum value in the signal comparing circuit as long as the brightness increases. If the brightness drops in the first line of the molten part of the zone, the RC circuit value with the large discharge time constant, will maintain the maximum value while the second RC circuit is only charged to the lower value which corresponds to the brightness drop. The voltages of the two RC circuits are fed to a difference amplifier the output of wich serves for triggering the control process.

BRIEF DESCRIPTION OF THE DRAWINGS

Other objects, features and advantages of the invention, its organization, construction and operation will be best understood from the following detailed description taken in conjunction with the accompanying drawings, on which.

DESCRIPTION OF THE PREFERRED EMBODIMENTS

Inasmuch as the present invention may advantageously be utilized in a system such as disclosed in the aforementioned Letters Patent, that patent is fully incorporated in the present disclosure by this reference.

Figures 1, 2:
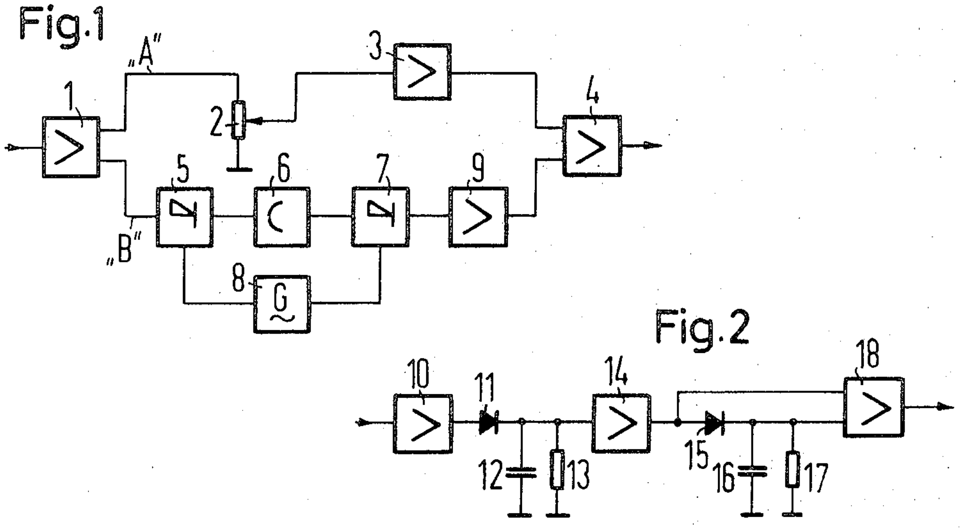
FIG. 1 is a schematic illustration of a part of the control loop concerning the invention and comprising an ultrasonic delay line in the signal comparing circuit.
FIG. 2 is a schematic block diagram of the signal comparing circuit of the control system which comprises two parallel RC circuits.
Figure 3:
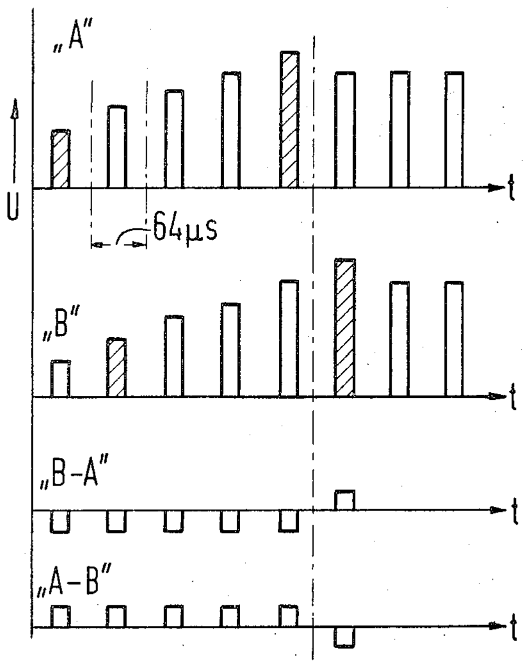
FIG. 3 is a graphic illustration showing the instantaneously provided pulses A with the maximum at the phase boundary, the pulses B delayed by one line duration, the difference B–A and the difference A-B of the circuit according to FIG. 1.

In the circuit arrangement illustrated in FIG. 1, the image signal arriving from the television camera is decoupled by way of an amplifier 1 and proceeds in a direct path A, via a level matching circuit, here a potentiometer 2, toward a further amplifier 3 and toward an input of a differential amplifier 4. The signal which is to be delayed traverses a path B and proceeds by way of a modulator 5, a delay line 6 and a demodulator 7. The modulation and demodulation with an auxiliary frequency produced by a generator 8 is required for matching the narrow band delay line to the wich band image signal. The image signal delayed by one line duration (64 $\mu$s) is available at the output of the demodulator 7. This image signal is amplified in an amplifier 9 and supplied to the second input of the differential amplifier 4. In FIG. 3, these signals are shown in a simplified form. Corresponding to the axial heat flow, the amplitude of the individual lines increases until the phase boundary has been reached; the radiation intensity decreases due to different surface radiation factors and remains constant during the duration of the scanning of the molten zone. In FIG. 3 A represents the instantaneous signals, B represents the signal delayed by one line, C represents the difference B–A, and D represents the difference A–B. It can be seen that the direction of the difference pulses changes in the first line after the phase boundary has been reached in the scanning process. This change is used for triggering the control system in the control loop.

The decoupled image signal is coupled to a first RC circuit including a capacitor 12 and a resistor 13 in the signal comparing circuit illustrated in FIG. 2, by way of a separation amplifier 10 and a diode 11. The charge time constant which results from the output resistor of the amplifier, the forward impedance of the diode 11 and the capacitance of the capacitor 12 must be small compared with the line scanning duration (approximately 1 $\mu$s), so that the capacitor 12 is quickly charged to the peak value of the line amplitude.

The discharge time constant of the RC circuit 12, 13 is selected in such a way that the vertical brightness distribution of the television picture maintains, but the line structure disappears, so that an enveloping curve of the image signal results. The best results are obtained with a value in the order of one line duration (approximately 64 $\mu$s).

A capacitor 16 is charged by way of a further amplifier 14, and a diode 15 in the embodiment according to FIG. 2. The charge time constant must also be small so that both capacitors 12 and 16 are charged to the same value during a brightness increase.

The RC circuit 16, 17 comprises a very large discharge time constant and stores the maximum image brightness until the discharge triggered by the vertical pulses at the image end. If the brightness decreases within an image line as, for example, at the solid liquid interface the voltage at the capacitor 12 will decrease corresponding to the brightness drop and according to a exponential function.

The voltage at the capacitor 16 which corresponds to the maximum image brightness maintains until the discharge. A voltage difference between the capacitors 12 and 16 therefore indicates a brightness drop.

Figure 4:
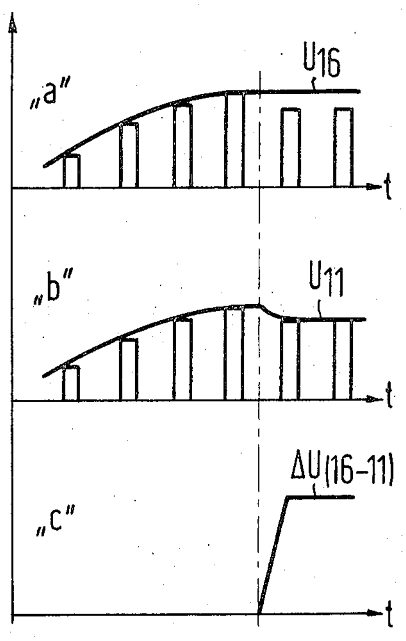
FIG. 4 illustrates, corresponding to the circuit according to FIG. 2, (a) the voltage at the capacitor 16 (b) the voltage at the capacitor 12 and (c) the output signal at the differential amplifier 18 from the difference of the voltages $U_{16}$–$U_{12}$.

In order to obtain a signal sufficient for triggering of a measuring process, both voltages of the capacitors 12, 16 which correspond to the voltage at the output of the amplifier 14 and the capacitor 16 are applied to the inputs of a differential amplifier 18 supplies the output signal represented in FIG. 4 (trace *c*) which comprises a preferred value at the phase boundary of solid-liquid and can be utilized for triggering the control loop.

Although we have described our invention by reference to specific illustrative embodiments, many changes and modifications of the invention may become apparent to those skilled in the art without departing from the spirit and scope of the invention and we therefore intend to include within the patent warranted hereon all such changes and modifications as may reasonably and properly be included within the scope of our contribution to the art.

We claim:

1. In a system for controlling the diameter of a semiconductor rod at the solidification front of a molten zone wherein the image of the molten zone is recorded by a television camera is scanned line by line in the television camera by an electron beam, in which a gating arrangement scans the image to produce a number of pulses corresponding to the diameter of the semiconductor rod, means responsive to a sudden change of radiation intensity when the solidification front is passed by the sensing beam to produce a triggering pulse, and a value proportional to the number of pulses is compared with a programmed desired value corresponding to the desired diameter of the semiconductor rod, and a push-pull system arrangement is connected to the semiconductor rod and operated in response to the deviation between the programmed value and the proportional value, the improvement therein comprising a signal comparing circuit connected between the television camera and the push-pull system for finding the line of a television image which is the first line in the molten-liquid range of the image of a molten zone, said signal comparing circuit receiving the instantaneous value of a signal from the television camera and the instantaneous value of the signal of the previously scanned line and operated in response to the two instantaneous signals to produce a difference signal, said difference signal employed for triggering the control process to stretch or compress the semiconductor rod.

2. In a system according to claim 1, comprising an ultrasonic delay line in said signal comparing circuit for providiing a time delay equal to the scanning time of one line, and a difference amplifier connected to said delay line and connected to said television camera for receiving delayed and undelayed signals.

3. In a system according to claim 1, wherein said signal comparing circuit comprises a pair of parallel connected RC circuit having short charge time constants with respect to the scanning duration of one line, a first of said RC circuits having a discharge time constant on the order of the scanning duration of one line and a second of said RC circuits having a discharge time constant which is very large compared with the scanning duration of one line so that the stored maximum image brightness signal remains constant over the entire scanning cycle of the television image in the molten zone and is discharged by an image change pulse of the television camera at the end of the scanning cycle, and a differential amplifier connected to said RC circuits for comparing the voltages there-across.

4. In a system according to claim 1, wherein said signal comparing circuit includes an input amplifier for receiving an image signal from the television camera and having a pair of outputs, a difference amplifier having a pair of inputs connected to respective ones of said outputs of said input amplifier, a signal level adjustment means and an further amplifier serially connected between one of said outputs of said input amplifier and one of said inputs of said differential amplifier, and signal delay means connected between the other said input amplifier and the other input of said difference amplifier.

5. In a system according to claim 4, wherein said delay means comprises an auxiliary frequency generator, a narrow band delay line connected between said modulator and said demodulator, said modulator and demodulator operable to adapt the narrow band delay line to the broad band image signal, and an amplifier connected between said demodulator and the other input of said differential amplifier.

* * * * *